United States Patent [19]

Senga

[11] Patent Number: 5,241,043

[45] Date of Patent: Aug. 31, 1993

[54] PROCESS FOR PREPARING A GRANULAR POLYARYLENE SULFIDES HAVING HIGH MOLECULAR WEIGHT

[75] Inventor: Minoru Senga, Ichihara, Japan

[73] Assignee: Idemitsu Petrochemical Company, Ltd., Tokyo, Japan

[21] Appl. No.: 632,692

[22] Filed: Dec. 24, 1990

[30] Foreign Application Priority Data

Dec. 25, 1989 [JP] Japan .................. 1-336123

[51] Int. Cl.$^5$ .................. C08G 75/14; C08G 85/00; C08F 2/00
[52] U.S. Cl. .................. 528/388; 526/65
[58] Field of Search .................. 528/388; 526/65

[56] References Cited

U.S. PATENT DOCUMENTS

| | | | |
|---|---|---|---|
| 4,089,847 | 5/1978 | Edmonds, Jr. | 260/79.1 |
| 4,393,197 | 7/1983 | Edmonds, Jr. | 528/388 |
| 4,921,935 | 5/1990 | Dorf et al. | 528/388 |

FOREIGN PATENT DOCUMENTS

| | | |
|---|---|---|
| 0259984 | 3/1988 | European Pat. Off. . |
| 0286298 | 10/1988 | European Pat. Off. . |
| 0323723 | 7/1989 | European Pat. Off. . |
| 0344977 | 12/1989 | European Pat. Off. . |
| 63-46228 | 2/1988 | Japan . |
| 64-9266 | 1/1989 | Japan . |
| 1-299826 | 12/1989 | Japan . |

Primary Examiner—John Kight, III
Assistant Examiner—T. Mosley
Attorney, Agent, or Firm—Nikaido, Marmelstein, Murray & Oram

[57] ABSTRACT

A process for preparing a granular polyarylene sulfide having a high molecular weight is a one-stage polycondensation process which involves subjecting a dihalogen aromatic compound to polycondensation with a source of sulfur in the presence of a polymerization aid in an organic polar solvent and setting the temperature for polycondensation to a range from 220° C. to 248° C. for a predetermined period of time prior to completion of polycondensation up to completion of polycondensation. The resulting granular polyarylene sulfide is suitable for molding or forming into sheets, films, fibers and so on, causes less burrs when subjected to injection molding, has a high molecular weight sufficient to create the property of forming a gel, and is easy to handle.

9 Claims, No Drawings

PROCESS FOR PREPARING A GRANULAR POLYARYLENE SULFIDES HAVING HIGH MOLECULAR WEIGHT

BACKGROUND OF THE INVENTION

1. Field of the Invention

The present invention relates to a process for preparing a granular polyarylene sulfide having a high molecular weight and a controlled particle size and, more particularly, to a process for preparing a granular polyarylene sulfide by using a polymerization aid so as to adjust a polymerization temperature, the granular polyarylene sulfide being suitable for the preparation of sheets, films, fibers and so on, causing less burrs to occur upon injection molding, having such a sufficiently high molecular weight as providing the property of forming a gel, and being easy to handle.

2. Description of Related Art

Among polyarylene sulfides such as polyphenylene sulfides, some are thermoplastic resins having partially thermosetting characteristics, which have excellent properties as engineering plastics, such as resistance to chemicals, good mechanical properties over a wide range of temperatures, and resistance to thermal rigidity.

Recently, demands have been made on processes for preparing polyarylene sulfides such as polyphenylene sulfides, which do not make them highly viscous by heating, which can provide them with a sufficiently high molecular weight only by polymerization, and which cannot impart color to them.

Heretofore, there have been made various proposals for such demands. For example, Japanese Patent Laid-open (kokai) Publication No. 46,228/1988 discloses a process for preparing a polyarylene sulfide by reacting a dihalogen aromatic compound with an alkali metal sulfide in a polar solvent, which comprises an early-stage polymerization step for forming a prepolymer having a low melting viscosity and a later-stage polymerization step for proceeding with further polymerization of the resulting prepolymer, wherein the early-stage polymerization step is carried out by reacting the dihalogen aromatic compound in such a state in which the arylene group and water are present at the rates of 0.5 mole to 3.5 moles and 0.5 mole to 5 moles, respectively, with respect to kilogram of an organic solvent in the reaction system, thereby converting the dihalogen aromatic compound at the conversion rate of 50% to 98% by mole into the prepolymer having a melting viscosity of 5 poises to 300 poises, and the later-stage polymerization step is carried out without separation of the resulting prepolymer from the reaction system by adding water to the reaction system so as to allow the water content in the reaction system to account for 1.5 mole to 15 moles per kilogram of the organic solvent, retaining the resulting reaction system at temperatures ranging from 257° C. to 290° C. with stirring for at least 10 minutes and then stirring the reaction system for at least 2 hours at temperatures reduced to the range from approximately 220° C. to 250° C. This polymerization process can yield the polyarylene sulfide with a high molecular weight, which is easy to handle.

Further, for example, Japanese Patent Laid-open (kokai) Publication No. 9,266/1989 discloses a polyarylene sulfide with improved burr characteristics, which is prepared by blending a non-crosslinked polyarylene thioether having a melting viscosity of 10 poises to $5 \times 10^4$ poises and a crosslinked polyarylene thioether having a melting viscosity of $5 \times 10^5$ poises to $1 \times 10^9$ poises with a fibrous filler and/or inorganic filler.

It cannot be said, however, that the process disclosed in Japanese Patent Laid-open (kokai) Publication No. 46,228/1988 comprises at least three steps for polymerization, including the step for preparing the prepolymer and it requires a long reaction period of time. And the polyarylene sulfide obtainable by this process has a relatively large molecular weight yet its molecular weight is not so high as demonstrating the property of forming a gel.

It is also noted that some of the polyarylene sulfides obtainable by the process disclosed in Japanese Patent Laid-open (kokai) Publication No. 9,266/1984 contain granules at the rate of approximately 20%, yet a majority of them are in a bulky state. Therefore, they are not said to be desired in handling.

As an improvement of this process, there has been proposed the process as disclosed in Japanese Patent Laid-open (kokai) Publication No. 299,826/1989. This process is a process for preparing a crosslinked polyarylene sulfide in a granular form, which comprises three steps including a step for converting a halogenated aromatic compound at the conversion rate of 50% to 98% by mole by using a branching agent in the presence of water in a predetermined amount at temperatures below 180° C. to 235° C., a step for elevating the temperature of the reaction system under a particular condition so as to yield a polymer having a particular range of its melting viscosity in the presence of a particular amount of water, and a step for continuing the reaction at temperature ranging from 245° C. to 290° C.

It is to be noted, however, that this process presents the problems that the steps and setting of reaction conditions are complex and the polymerization temperature in the first step is so low that the polymerization period of time becomes very long.

SUMMARY OF THE INVENTION

Therefore, the present invention has been completed under the circumstances as described hereinabove and has the object to provide a simplified process for preparing a granular polyarylene sulfide, which can solve the problem that it is difficult to collect the product due to adherence to a polymerization reactor, the granular polyarylene sulfide being suitable for the molding or forming into sheets, films, fibers and so on and easy to handle, and having such a high molecular weight as providing the property of forming a gel.

In order to achieve the aforesaid object, the present invention consists of a process for preparing a granular polyarylene sulfide having a high molecular weight by polycondensing a dihalogen aromatic compound with a source of sulfur in the presence of a polymerization aid in an organic polar solvent, wherein the polycondensation temperature is so set as to range from 220° C. to 248° C. for a predetermined period of time up to the time of completion of polycondensation.

DESCRIPTION OF THE PREFERRED EMBODIMENTS

The present invention will be described more in detail.

Raw Materials (1) Source of Sulfur

The sulfur source to be used for the present invention may include an alkali metal sulfide, an alkali metal hydrosulfide and hydrogen sulfide.

The alkali metal sulfide may include, for example, lithium sulfide, sodium sulfide, potassium sulfide, rubidium sulfide and cesium sulfide.

Among the sulfur sources described hereinabove, lithium sulfide and sodium sulfide are preferred, and sodium sulfide is particularly preferred.

The aforesaid alkali metal sulfides may be used singly or in combination of two or more.

It is further noted that the alkali metal sulfide may be one obtainable by the reaction of an alkali metal hydrosulfide with a base.

In other words, the alkali metal hydrosulfide may be used together with the base, in place of or in addition to the alkali metal sulfide.

Furthermore, it is to be noted that hydrogen sulfide can be used as the source of sulfur together with the base or hydrogen sulfide can be likewise used together with the base in addition to the alkali metal sulfide and/or the alkali metal hydrosulfide.

The alkali metal hydrosulfide may include, for example, lithium hydrosulfide, sodium hydrosulfide, potassium hydrosulfide, rubidium hydrosulfide and cesium hydrosulfide.

Among those alkali metal hydrosulfides, sodium hydrosulfide and lithium hydrosulfide are preferred, and sodium hydrosulfide is particularly preferred.

The aforesaid alkali metal hydrosulfides may be used singly or in combination of two or more.

The base may be any acid receptor of an inorganic type or of an organic type, which can convert the alkali metal hydrosulfide into the alkali metal sulfide, which can convert hydrogen sulfide into the alkali metal hydrosulfide, or which can effectively neutralize or receive a hydrogen halide producible upon polycondensation of the alkali metal hydrosulfide or hydrogen sulfide with the dihalogenated aromatic compound, as will be described hereinafter, and which does not adversely affect the object of the present invention. An alkali metal hydroxide or the like may usually be used appropriately as the base.

Specific examples of the alkali metal hydroxides may include, for example, lithium hydroxide, sodium hydroxide, potassium hydroxide, rubidium hydroxide, and cesium hydroxide.

Among these alkali metal hydroxides, lithium hydroxide and sodium hydroxide are preferred, and sodium hydroxide is particularly preferred.

The base of the organic type may include, for example, a metal salt of an ω-hydroxycarboxylic acid and an alkali metal aminoalkanoate.

The aforesaid bases may be used singly or in combination of two or more.

The rate of the base may sufficiently range from 0.80 mole to 1.2 moles with respect of mole of the total hydrogen atoms of the alkali metal hydrosulfide and hydrogen sulfide.

As the alkali metal sulfide and the alkali metal hydrosulfide, there may be used ones of industrial grade containing hydrated water in the amount of 2.6 moles to 9 moles per mole of them. If such industrial grade one containing smaller than 1.2 moles of hydrated water with respect to mole of the alkali metal sulfide or the alkali metal hydrosulfide is used, an appropriate amount of water may be added to the reaction system.

As described hereinabove, in accordance with the present invention, it is preferred that a small amount of water be present in the reaction system prior to polymerization because the polymerization aid such as a lithium halide, an alkali metal salt of a carboxylic acid or the like.

(2) Dihalogen Aromatic Compounds

The dihalogen aromatic compound to be used for the present invention may be any compound which is known to the art as useful for preparing the polyarylene sulfides.

The dihalogen aromatic compound may include, for example, a dihalobenzene such as m-dihalobenzene and p-dihalobenzene; an alkyl-substituted dihalogenzene and a cycloalkyl-substituted dihalobenzene such as 2,3-dihalotoluene, 2,5-dihalotoluene, 2,6-dihalotoluene, 3,4-dihalotoluene, 2,5-dihaloxylene, 1-ethyl-2,5-dihalobenzene, 1,2,4,5-tetramethyl-3,6-dihalobenzene, 1-n-hexyl-2,5-dihalobenzene and 1-cyclohexyl-2,5-dihalobenzene; an aryl-substituted dihalobenzene such as 1-phenyl-2,5-dihalobenzene, 1-benzyl-2,5-dihalobenzene and 1-p-toluyl-2,5-dihalobenzene; a dihalobiphenyl such as 4,4'-dihalobiphenyl; and a dihalonaphthalene such as 1,4-dihalonaphthalene, 1,6-di-halonaphthalene, and 2,6-dihalonaphthalene.

The two halogen atoms in these dihalogen aromatic compounds may be fluorine, chlorine, bromine or iodine and they may be the same as or different from each other.

Among those dihalogen aromatic compounds as described hereinabove, the dihalobenzenes are preferred, and the dichlorobenzenes containing 70% by mole of p-dichloroben-zene or more is particularly preferred.

(3) Polymerization Aids

In the process according to the present invention, it is significant that the dihalogen aromatic compound is polycondensed with the sulfur source in the presence of the polymerization aid.

The polymerization aid to be employed for the present invention may include an organic acid salt or an inorganic acid salt, which is soluble in the organic polar solvent to be used for polymerization.

Specific examples of the polymerization aids may include, for example, lithium chloride, lithium fluoride, lithium acetate, sodium acetate, or the like.

Among those polymerization aids, lithium chloride is particularly preferred.

(4) Branching Agents, etc.

In accordance with the present invention, a branching agent, such as an active-hydrogen containing, halogen aromatic compound, a polyhalogen aromatic compound containing three halogen atoms or more in one molecule and a halogen aromatic nitro compound, or the like, may appropriately be selected and be added to the reaction system.

As the active-hydrogen containing, halogen aromatic compound, there may be mentioned a halogen aromatic compound with a functional group or groups having active hydrogen atom, such as an amino group, mercapto group, hydroxyl group or the like. More specifically, the active-hydrogen, containing halogen aromatic compound may include, for example, a dihaloaniline such as 2,6-dichloroaniline, 2,5-dichloroaniline, 2,4-dichloroaniline and 2,3-dichloroaniline, a trihaloaniline such as 2,3,4-trichloroaniline, 2,3,5-trichloroaniline, 2,4,6-trichloroaniline and 3,4,5-trichloroaniline, a dihaloaminodiphenyl ether such as 2,2'-diamino-4,4'-dichlorodiphenyl ether and 2,4'-diamino-2',4- dichlorodiphenyl ether, and a mixture thereof, and those in which the amino group is replaced by the other functional group such as thiol group or hydroxyl group.

There may also be used an active-hydrogen containing, halogen aromatic compound in which hydrogen atom or atoms joined to the carbon atom or atoms forming its aromatic ring is or are replaced by another inert group or groups such as a carbohydryl group, i.e., an alkyl group.

Among the active-hydrogen containing, halogen aromatic compounds, the active-hydrogen containing, dihalogen aromatic compound is preferred. Dichloroaniline is particularly preferred.

As the polyhalogen aromatic compound having three halogen atoms or more in one molecule, there may specifically be used 1,2,4-trichlorobenzene, 1,3,5-trichlorobenzene, and 1,4,6-trichloronaphthalene.

The halogen aromatic nitro compound may include, for example, a mono- or di-halonitrobenzene such as 2,4-dinitrochlorobenzene or 2,5-dichloronitrobenzene, a dihalonitrodiphenyl ether such as 2-nitro-4,4'-dichlorodiphenyl ether, a dihalonitrodiphenyl sulfone such as 3,3'-dinitro-4,4'-dichlorodiphenyl sulfone, a mono- or di-halonitropyridine such as 2,5-dichloro-3-nitropyridine or 2-chloro-3,5-dinitropyridine, or a dihalonitronaphthalene.

Various characteristics of the polymers to be produced by the process according to the present invention may be further improved by increasing the branching degree of the resulting polymer, further increasing the molecular weight of the resulting polymer or forming the polymer with a decreased melt flowability and with the property of forming a gel by using these active-hydrogen containing, halogen aromatic compound, polyhalogen aromatic compound, halogen aromatic nitro compound, or the like.

In accordance with the process of the present invention, these branching agent may be employed singly or in combination with two or more.

(5) Organic Polar Solvents

As the organic polar solvent to be used for the present invention, there may be used a non-protonic organic solvent such as an amide compound, a lactam compound, a urea compound and a cyclic organophosphorus compound.

The amide compound may include, for example, N,N-dimethylformamide, N,N-dimethylacetamide, N,N-diethylacetamide, N,N-dipropylacetamide, N,N-dimethylbenzoic amide, and the like.

The lactam compound may include, for example, caprolactam, N-methylcaprolactam, N-ethylcaprolactam, N-n-propylcaplactam, N-isopropylcaprolactam, N-n-butylcaprolactam, N-isobutylcaprolactam, N-cyclohexylcaprolactam, N-methyl-2-pyrrolidone, N-ethyl-2-pyrrolidone, N-n-propyl-2-pyrrolidone, N-isopropyl-2-pyrrolidone, N-n-butyl-2-pyrrolidone, N-isobutyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethyl-2-piperidone, and the like.

As the urea compound may be used, for example, tetramethyl urea, N,N'-dimethylethyleneurea, N,N'-dimethylpropylene urea, and so on.

The cyclic organophosphorus compound may include, for example 1-methyl-1-oxosulphorane, 1-ethyl-1-oxosulphorane, 1-phenyl-1-oxosulphorane, 1-methyl-1-oxophosphorane, 1-n-propyl-1-oxophosphorane, 1-phenyl-1-oxophosphorane; and the like.

These solvents may be employed singly or in combination of two or more.

Among those solvents, an N-alkyllactam and an N-alkylpyrrolidone are preferred. Particularly preferred is N-methyl-2-pyrrolidone.

(6) Rates of Blending

The rate of the dihalogen aromatic compound may range usually from 0.95 mole to 1.30 moles, preferably from 0.97 mole to 1.20 moles, with respect to mole of the sulfur atom in the sulfur source, when no branching agent is employed. When the branching agent is employed, the number of total moles of the dihalogen aromatic compound and the branching agent may be adjusted to range usually from 0.95 mole to 1.30 moles, preferably from 0.97 mole to 1.20 moles, with respect to mole of the sulfur atom in the sulfur source.

If the rate of the dihalogen aromatic compound is less than 0.95 mole with respect to mole of the sulfur atom in the sulfur source when no branching agent is employed or if the number of total moles of the dihalogen aromatic compound and the branching agent is less than 0.95 mole with respect thereto when the branching agent is employed, on the one hand, by-products such as thiophenol may be prepared. On the other hand, if the dihalogen aromatic compound would be employed at the rate of more than 1.30 moles with respect to mole of the sulfur atom in the sulfur source when no branching agent is employed or if the number of total moles of the dihalogen aromatic compound and the branching agent is less than 1.30 moles with respect thereto when the branching agent is employed, the molecular weight of the resulting polyarylene sulfides may be reduced.

The rate of the organic polar solvent to be used may range usually from 1 mole to 30 moles, preferably from 3 moles to 15 moles, with respect to mole of the sulfur atom of the sulfur source. In this case, if the rate of the organic polar solvent would be less than one mole, on the one hand, the reaction may not proceed to a sufficient extent. If the organic polar solvent would be employed at the rate larger than 20 moles, on the other hand, the volume efficiency may be worsened, thereby reducing productivity.

The rate of the branching agent to be optionally used may be in the range usually from 0.0005 mole to 0.05 mole, preferably from 0.001 mole to 0.02 mole, with respect to mole of the sulfur atom in the sulfur source.

The polymerization aid may be employed at the rate ranging usually from 0.05 mole to 2.0 moles, preferably from 0.2 mole to 1.2 moles, with respect to mole of the sulfur atom of the sulfur source. In this case, if the rate of the polymerization aid would be less than 0.05 mole with respect to mole of the sulfur atom in the sulfur source, on the one hand, the effect of adding the polymerization aid cannot be demonstrated to a sufficient extent, the reaction velocity may become slower, and the resulting polyarylene sulfide cannot increase its molecular weight or purity to a sufficient level. If the polymerization aid would be employed at the rate greater than 2.0 moles, on the other hand, the effect cannot be achieved so as to comply with the use of such a large amount of the polymerization, thereby raising costs for preparation. In this case, therefore, the process is disadvantageous in terms of economy.

Polycondensation

The process according to the present invention can provide the polyarylene sulfides by polycondensing the dihalogen aromatic compound with the source of sulfur in the presence of the polymerization aid in the organic polar solvent, preferably in the presence of the branching agent.

A preferred example of the polycondensation involves, first, dehydrating a mixture of the sulfur source and the polymerization aid with the organic polar solvent by heating it, for example, under streams of an inert gas or under reduced pressures at a predetermined temperature for a predetermined period of time and, after the lapse of the predetermined period of time, reducing the temperature of the reaction system, followed by adding the dihalogen aromatic compound and, if necessary, the branching agent to the reaction system and reacting the mixture at a predetermined temperature for a predetermined period of time.

The polymerization to be employed for the present invention is not restricted to the aforesaid example and, for example, the polymerization aid may be added after the dehydration. It is further noted that the water content in the polycondensation step may be usually 2.5 moles or less with respect to mole of the sulfur source, preferably 1.5 moles or less with respect to mole of the sulfur source particularly when lithium chloride is employed.

It should be noted in accordance with the present invention that the temperature for the polycondensation during the polymerization is of extreme significance. In particular, it is significant that, in the polycondensation step, the temperature is set to lie in the range usually from 220° C. to 248° C., preferably from 225° C. to 248° for a predetermined period of time ranging from the predetermined time point prior to the completion of polycondensation up to the time point of the completion of polycondensation. If the temperature at this time would become lower than 220° C., on the one hand, the reaction velocity may become too slow to be practical. If the temperature at this time would exceed 248° C., on the other hand, the resulting polymer may become bulky, thereby failing to yield the granular polyarylene sulfide easy in handling. It is to be noted, herein, that the terms "completion of completion" referred to hereinabove is intended to mean the stop of the operation for polycondensation yet is not necessarily intended to mean the completion of reaction at a 100% rate.

The period of time for which the temperature should be retained in the range of 220° C. to 248° C. may vary with the kind and the rate of each component to be employed, the kind and the rate of the polymerization aid to be employed, and so on, and cannot be determined uniformly. When the reaction time required from the start of polycondensation to the completion of polycondensation may range from 0.5 hour to 20 hours, the period of time for which the polycondensation should be retained at the temperatures ranging from 220° C. to 248° C. may be in the range usually within 10 hours, preferably from 10 minutes to 8 hours, prior to the completion of polycondensation.

This period of time is determined on the basis of the fact that p-dichlorobenzene is converted at the rate ranging from 70% to 98% and that the polycondensation is carried out at the temperature ranging from 220° C. to 248° C. prior to the timing at which the logarithmic number, $\eta_{inh}$ of the resulting polyarylene sulfide indicates usually 0.3 or larger.

It is further to be noted that, in accordance with the process according to the present invention, although the polycondensation may be carried out at the temperature ranging from 220° C. to 248° C. from the start of polycondensation to the completion of the polycondensation, it will take a long period of time. It is accordingly effective in terms of shortening the reaction time that the polycondensation is carried out at the temperature ranging from 250° C. to 290° C. at the time of the start of polycondensation and the reaction temperature is lowered to 220° C. to 248° C. at which the polycondensation is continued to proceed for the predetermined period of time prior to the completion of polycondensation, thereby making the resulting polyarylene sulfide higher in molecular weight and granular. The reaction temperature at 250° C. to 290° C. may be maintained constantly or reduced or elevated gradually in a stepwise manner or in a continuous manner. If the reaction temperature would exceed 290° C., side reactions may occur and the resulting polymer may deteriorate, thereby resulting in the causes of making the resulting polymer irregular, such as coloration or gellation.

As a reactor for polycondensation, there may be employed any device which has conventionally been employed for polymerization. The kind of a stirrer is not restricted to a particular one and the effect sought to be achieved by the present invention can particularly be demonstrated by using a paddle wing or the like.

Polyarylene Sulfides

The polyarylene sulfide synthesized by the polymerization may be isolated by separating it directly from the reaction mixture by a standard method, such as filtration, centrifugal separation or the like, or by separating it from the reaction mixture after addition of water and/or a flocculating agent such as a dilute acid.

The polymer separated is then washed usually with water, N-methylpyrrolidone (NMP), methanol, acetone, benzene, toluene, or the like to remove the alkali metal halide, alkali metal sulfide, polymerization aid, by-products and the like which adhere to the polymer.

The resulting polymer may be recovered by distilling the solvent off from the reaction mixture without separation therefrom and by washing the residue in the same manner as above. The solvent recovered may be reused.

In accordance with the process of the present invention, the granular polyarylene sulfide having a sufficiently high molecular weight, which has a logarithmic viscosity number $\eta_{inh}$ of 0.30 or higher and a melt index (MI) of 0 to 50 grams per 10 minutes and, in some cases, which can demonstrate the property of forming a gel and have a controlled particle size ranging from 0.5 mm to 5 mm, can be prepared by the simplified mode of steps with ease and stability. In accordance with the present invention, the form of the resulting polyarylene sulfide referred to as "granular" may be in a form of beads as well as in a form of granules.

The polyarylene sulfides prepared in the manner as described hereinabove may be subjected to desalting treatment, if needed, thereby reducing the content of a salt, such as sodium chloride, in the polymer.

The polyarylene sulfides prepared by the process according to the present invention may be formed into various products by formulating them with an appropriate amount of other polymers, fillers such as pigment, graphite, metallic powder, glass powder, quartz powder, talc, calcium carbonate, glass fibers, carbon fibers, whiskers, a stabilizer, a lubricant or the like. The resulting polyarylene sulfide can appropriately be used for various molding materials and materials for films, fibers, mechanical parts, electronic parts, and so on.

The present invention will be described more in detail by way of examples with reference to comparative examples. It is to be understood, however, that the present invention is not considered in any respect to be limitative to the examples.

EXAMPLE 1

A 10-liter autoclave was charged with 1,369 grams (8.14 moles) of sodium sulfide pentahydrate ($Na_2S \cdot 5H_2O$), 345 grams (8.14 moles) of lithium chloride (LiCl), and 4,161 ml of N-methylpyrrolidone (NMP). The autoclave was heated to 195° C. under nitrogen gas stream to distill off 1,830 ml of a mixture of water with N-methyl-2-pyrrolidone. At the same time, hydrogen sulfide gas ($H_2S$) was distilled off into the solution at the rate of 6.88% by mole with respect to $Na_2S$. Then the autoclave was cooled to about 100° C. To the autoclave, a mixture of 1,108 grams (7.54 moles) of p-dichlorobenzene (p-DCB), 8.74 grams (0.046 mole) of dichloronitrobenzene (DCNB), and 1,500 ml of NMP was added, and the resulting mixture was subjected to polycondensation at 260° C. for 30 minutes and then at 245° C. for 4 hours. Thereafter, the resulting polyphenylene sulfide (PPS) in a granular form was separated through 60-mesh sieve, washed with water and then with acetone, and dried under vacuum condition. The resulting granular PPS was found to have an average particle size of 4,100 microns. The polymer after the reaction at 260° C. for 30 minutes had a logarithmic viscosity number $\eta_{inh}$ of 0.22 and a conversion rate of 81%.

The result is shown in Table below.

EXAMPLES 2 TO 5

The polyarylene sulfides were prepared in substantially the same manner as in Example 1, except for a pattern of the temperatures for polycondensation and the use of sodium acetate in example 5 instead of the lithium chloride which was used in example 1.

The results are shown in Table below.

COMPARATIVE EXAMPLE 1

The polyarylene sulfide was prepared in substantially the same manner as in Example 1, except for the polycondensation at 260° C. It was found as a result that the stirring of the reaction system became disabled in 1.5 hours due to adherence of the polymer to the paddle wings.

COMPARATIVE EXAMPLE 2

The polyarylene sulfide was prepared in substantially the same manner as in Example 1, except for using the patter of the reaction temperatures shown in Table below. It was also found that the stirring of the reaction mixture disabled because the resulting mixture became solidified.

REFERENCE EXAMPLE

The polyarylene sulfide was prepared in substantially the same manner as in Example 1, except for maintaining the reaction temperature constantly at 260° C. excluding the timing at which p-dichlorobenzene, dichloronitrobenzene and NMP were charged.

The results are shown in Table below. In instances where the melt index is higher than 200 grams per 10 minutes, the polymer in a granular form can be prepared without controlling the temperature.

EXAMPLE 6

The procedures were followed in substantially the same manner as in Example 1, except for using 111.0 grams (7.56 moles) of p-dichlorobenzene and 4.37 grams (0.023 mole) of 2,5-dichloronitrobenzene, carrying out polycondensation at 235° C. for 5 hours and the use of sodium acetate instead of the lithium chloride which was used in Example 1.

The results are shown in Table below.

COMPARATIVE EXAMPLE 3

The polyarylene sulfide was prepared in substantially the same manner as in Example 6, except for carrying out polycondensation at 260° C. for 2 hours.

The result is shown in Table below.

TABLE

| | Pattern of Polycondensation Temperature | Yield of Granules (wt %) | $\eta_{inh}$ | MI (grams/10 min) | Average Particle Size, μ | Remarks |
|---|---|---|---|---|---|---|
| Example 1 | 260° C. for 0.5 hr after start of polycondensation and then 245° C. for 4 hrs up to end of polycondensation | 86 | Not Dissolved | 0 | 4.1 | |
| Example 2 | 260° C. for 0.5 hr after start of polycondensation and then 235° C. for 4 hrs up to end of polycondensation | 85 | Not Dissolved | 0 | 1.9 | |
| Example 3 | 235° C. for 5 hrs from start of polycondensation to end of polycondensation | 86 | Not Dissolved | 0 | 4.0 | Branchg Agent: TCB |
| Example 4 | 245° C. for 5 hrs from start of polycondensation to end of polycondensation | 86 | Not Dissolved | 0 | 4.0 | |
| Example 5 | 260° C. for 0.5 hr after start of polycondensation and then 235° C. for 4 hrs up to end of polycondensation | 72 | 0.40 | 2 | 0.8 | Sodium acetate |
| Example 6 | 235° C. for 5 hrs from start of polycondensation to end of polycondensation | 72 | 0.36 | 10 | 0.5 | Sodium acetate |
| Comparative Example 1 | 260° C. for 1.5 hrs from start of polycondensation to end of polycondensation | — | — | — | — | |
| Comparative Example 2 | 260° C. for 0.5 hr after start of polycondensation, then 245° C. for 0.5 hr thereafter, and 260° C. for 1 | — | — | — | — | |

TABLE-continued

| | Pattern of Polycondensation Temperature | Yield of Granules (wt %) | $\eta_{inh}$ | MI (grams/ 10 min) | Average Particle Size, μ | Remarks |
|---|---|---|---|---|---|---|
| Comparative Example 3 | hr up to end of polycondensation 260° C. for 2 hrs from start of polycondensation to end of polycondensation | — | 0.37 | 8 | Aggregated | Sodium acetate |
| Reference Example | 260° C. for 3 hrs from start of polycondensation to end of polycondensation | — | 0.26 | 200 | 1.9 | |

MI: Melting viscosity: in accordance with ASTM D1238; 600° F., 5 kg (conditions setting flow tester)
$\eta_{inh}$: Solution viscosity: a sample in a granular form being dissolved in α-chloronaphthalene in the concentration of 0.4 grams per micron; using a viscometer (UBE) at 206° C.

What is claimed is:

1. In the process for preparing a granular polyarylene sulfide gel by polycondensation reacting together a dihalogen aromatic compound, a source of sulfur, a polymerization aid, and a branching agent in an organic polar solvent at elevated temperatures sufficient to support said polycondensation reaction;
    the improvement, whereby forming said polyarylene sulfide having an inherent viscosity of at least 0.3 and a melt index of 0 gram/10 minutes, which comprises:
    said polymerization aid being an inorganic salt;
    carrying out said polymerization at a temperature higher than 248° C. until about 70 to 98% of said dihalogen aromatic compound is converted;
    then lowering the temperature of said polycondensation to about 220° to 248° C. until a granular polyarylene sulfide gel having an inherent viscosity of at least 0.3 and a melt index of 0 gram/10 minutes is formed; and
    recovering said granular polyarylene sulfide.

2. A process for preparing a granular polyarylene sulfide having a high molecular weight as claimed in claim 1, wherein said source of sulfur is at least one member selected from the group consisting of an alkali metal sulfide, an alkali metal hydrosulfide and hydrogen sulfide.

3. A process for preparing a granular polyarylene sulfide having a high molecular weight as claimed in claim 1, wherein said source of sulfur is at least one member selected from the group consisting of lithium sulfide and sodium sulfide.

4. A process for preparing a granular polyarylene sulfide having a high molecular weight as claimed in claim 1, wherein said dihalogen aromatic compound is a dihalobenzene.

5. A process for preparing a granular polyarylene sulfide having a high molecular weight as claimed in claim 1, wherein said polymerization aid is lithium chloride.

6. A process for preparing a granular polyarylene sulfide having a high molecular weight as claimed in claim 1, wherein said branching agent is at least one member selected from the group consisting of an active-hydrogen containing halogen aromatic compound, a polyhalogen aromatic compound containing three halogen atoms or more in one molecule, and a halogen aromatic nitro compound.

7. A process for preparing a granular polyarylene sulfide having a high molecular weight as claimed in claim 1, wherein said branching agent is an active-hydrogen containing dihalogen aromatic compound.

8. A process for preparing a granular polyarylene sulfide having a high molecular weight as claimed in claim 1, wherein said branching agent is dichloroaniline.

9. A process for preparing a granular polyarylene sulfide having a high molecular weight as claimed in claim 1, wherein said organic polar solvent is a lactam compound.

* * * * *